United States Patent [19]

Kranz

[11] 4,039,346
[45] Aug. 2, 1977

[54] CONVERSION OF CRUDE COPPER PHTHALOCYANINES INTO PIGMENTS

[75] Inventor: Joachim Kranz, Ludwigshafen, Germany

[73] Assignee: BASF Aktiengesellschaft, Ludwigshafen (Rhine), Germany

[21] Appl. No.: 655,459

[22] Filed: Feb. 5, 1976

[30] Foreign Application Priority Data

Feb. 18, 1975 Germany .......................... 2506832

[51] Int. Cl.$^2$ .............................................. C08K 5/34
[52] U.S. Cl. ........................... 106/288 Q; 106/308 N; 106/309; 260/314.5
[58] Field of Search ............... 106/309, 288 Q, 308 N; 260/314.5

[56] References Cited

U.S. PATENT DOCUMENTS

| | | | |
|---|---|---|---|
| 2,861,005 | 11/1958 | Siegel | 106/288 Q |
| 3,288,621 | 11/1966 | Barron et al. | 106/288 Q |
| 3,713,857 | 1/1973 | Shapiro | 106/288 Q |
| 3,920,469 | 11/1975 | Kienzle et al. | 106/288 Q |
| 3,951,678 | 4/1976 | Wanser | 106/288 Q |

Primary Examiner—Winston A. Douglas
Assistant Examiner—J. V. Howard
Attorney, Agent, or Firm—Keil, Thompson & Shurtleff

[57] ABSTRACT

A process for converting copper phthalocyanine into a pigmentary form, wherein finely divided crude copper phthalocyanine, which has crystallized irregularly and is heavily agglomerated, is finished in the presence of basic copper phthalocyanines of the formula

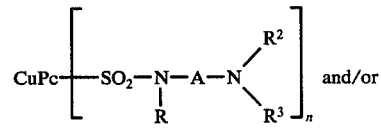 and/or

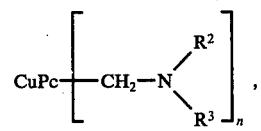

where CuPc is an n-valent copper phthalocyanine radical, $R^1$ is hydrogen or alkyl, A is alkylene of 2 to 6 carbon atoms, $R^2$ is alkyl, alkoxyalkyl or cycloalkyl and $R^3$ is hydrogen or alkyl, or the group

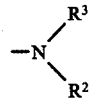

is a saturated 5-membered, 6-membered or 7-membered heterocyclic ring and n is from 1 to 6, in from 50 to 75% strength by weight sulfuric acid at from room temperature to 100° C.

The pigments obtained are of significantly greater tinctorial strength than the pigmentary forms obtained in the absence of basic copper phthalocyanines.

10 Claims, No Drawings

CONVERSION OF CRUDE COPPER PHTHALOCYANINES INTO PIGMENTS

The present invention relates to a process for converting crude copper phthalocyanines into pigments of high tinctorial strength.

Since the isoluble colorants (ie. the crude pigments) obtained from the synthesis reaction are in most cases not in a form (in respect of crystal shape and particle size) in which they have optimum tinctorial properties, and in particular maximum tinctorial strength, these crude pigments must be converted into suitable pigmentary forms. This conversion into a form suitable for tinctorial purposes is described as conditioning or finishing.

One of the principal problems in finishing crude pigments is to choose, and maintain, conditions which ensure that the product of the process (ie. the pigmentary form) has the particle size which corresponds to a product of optimum tinctorial properties. Optimum tinctorial properties of the pigment are not achieved if the size of the crystals is either above or below a certain value.

The finishing of the crude pigment can be affected by impurities or by-products contained in the crude pigment, and also by additives introducwed before or during finishing, if these are incorporated into the crystal, or deposited on the surface of the crystal, during the recrystallization which takes place in the course of finishing.

When finely divided crude copper phthalocyanines are finished in a sulfuric acid medium — a method whereby pigments in the α-, β- or γ-modification can be obtained, depending on the concentration of the surfuric acid and the termperture — the pigment particles tend to "over-crystallize", ie. the lengthwise growth of the crystals is favored, and as a result needle-shaped or rod-shaped crystals are often produced. The tinctorial properties of such pigments are no more than mediocre.

The effect of "over-crystallization" or "over-finishing" occurs particularly if, in order to achieve particular pigment properties, the finishing (or treatment) in sulfuric acid is followed by an after-treatment.

We have found that the disadvantages of over-crystallization on converting crude copper phthalocyanines into a pigmentary form by sulfuric acid treatment of a finely particled copper phthalocyanine, which has crystallized irregularly and is heavily agglomerated, and which has a primary particle size of less 0.1μ and has been obtained by grinding a crude copper phthalocyanine, can be avoided almost entirely if the ground material is finished in from 50 to 75% strength sulfuric acid, at from room temperature to 100° C, in the presence of from 0.5 to 7% by weight, based on the crude copper phthalocyanine, of one or more basic copper phthalocyanines of the formula

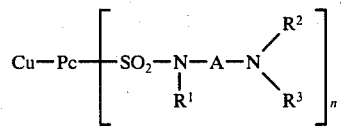

(I)

or

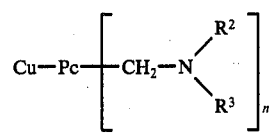

(II)

or mixtures thereof, where CuPc is an n-valent copper phthalocyanine radical, $R^1$ is hydrogen or alkyl of 1 to 4 carbon atoms, A is saturated, linear or branched alkylene of 2 to 6 carbon atoms $R^2$ is alkyl of 1 to 20 carbon atoms, alkoxyalkyl of a total of 3 to 12 carbon atoms or cycloalkyl of 6 to 8 carbon atoms, $R^3$ is hydrogen, alkyl of 1 to 4 carbon atoms or cycloalkyl of 6 to 8 carbon atoms or the group

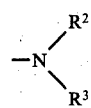

20 is a saturated heterocyclic 5-membered, 6-membered or 7-membered ring which may additionally contain an oxygen, sulfur or nitrogen atom as a ring member, and n is from 1 to 6, and the pigmentary form is then isolated.

Using the process according to the invention, pigments, of high tinctorial strength, of the α-, β- and γ-modification of copper phthalocyanine may be obtained. These pigments have an advantageous particle size distribution.

The starting material is finely particled copper phthalocyanine obtained by grinding crude copper phthalocyanine in a ball mill in the presence or preferably in the absence of grinding aids, such as salts, eg. socium chloride, sodium sulfate, calcium chloride and the like. The crude copper phthalocyanine used can be either practically halogen-free or contain up to 5% by weight of chlorine, corresponding to monochloro-copper phthalocyanine. During grinding in the ball mill, the crude copper phthalocyanine which, as a rule, is present as the β-modification is in part converted to the α-modification, ie. the ground material is a mixture of the α-modification and β-modification of copper phthalocyanine. Because of the crystals which are crushed during grinding, and the high surface charges which this generates, the ground material is very heavily agglomerated. The agglomerates, which are of up to 150 μ in size, are formed from particles, referred to as primary particles, which are smaller than 0.1 μ. The mean primary particle size is preferably from 0.05 to 0.01 μ. This finely particled material is obtained by, eg., grinding crude copper phthalocyanine for from 10 to 40 hours and a ball mill without grinding aids.

Basic copper phthalocyanines which act as growth regulators in the process of the invention are those of the formula

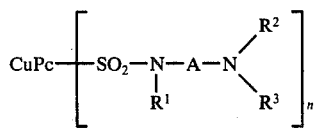

(I)

and/or (II)

-continued

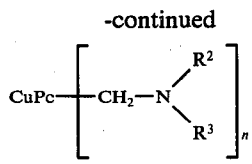

where R², R², R³, A and n have the following meanings:

R¹ is alkyl of 1 to 4 carbon atoms, eg. methyl, ethyl, propyl or butyl, or, preferably, is hydrogen.

R² is alkyl of 1 to 20 carbon atoms, alkoxyalkyl of a total of 3 to 12 carbon atoms or cycloalkyl of 6 to 8 carbon atoms, eg. methyl, ethyl, propyl, isopropyl, butyl, isobutyl, sec.-butyl, pentyl, isopentyl, hexyl, isohexyl, octyl, 2-ethylhexyl, nonyl, decyl, isodecyl, dodecyl, stearyl, palmityl, 2-methoxyethyl, 2-ethoxyethyl, 2-butoxyethyl, 3ethoxypropyl, 3-methoxypropyl, 3butoxypropyl, 3-(2'-ethylhexoxy)-propyl, cycohexyl, methylcyclohexyl and dimethylcyclohexyl.

R³ is hydrogen, alkyl of 1 to 4 carbon atoms, eg. methyl, ethyl, propyl, isopropyl, butyl, isobutyl or sec.-butyl, or cycloalkyl of 6 to 8 carbon atoms, eg. cyclohexyl or methylcyclohexyl.

A is saturated linear or branched alkylene of 2 or 6 carbon atoms, eg. 1,2-butylene, 1,3-butylene, 1,6-hexylene or, preferably, 1,2-ethylene, 1,2-propylene and 1,3-propylene.

The group

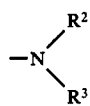

may alternatively be a saturated 5-membered, 6-membered or 7-membered heterocyclic ring which in addition can contain one of the groups —O—, —N— and —S— as a ring member. Specific examples are the N-piperidyl, N-morpholinyl, N'-methyl-N-piperazinyl, N-thiomorpholinyl or N-hexamethyleneimine (—N(CH₂)₆)

radical.

n is an interger from 1 to 6, preferably from 2 to 4.

For technical and economic reasons, preferred basic copper phthalocyanines of the formulae I and II are those where R¹ is hydrogen, R² is alkyl of 1 to 8 carbon atoms, eg. hexyl, octyl or 2-ethylhexyl, but preferably methyl, ethyl, propyl or butyl, cyclohexyl or methylcyclohexyl, R³ is hydrogen, methyl, ethyl, propyl butyl or cyclohexyl, or

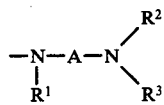

is

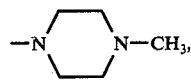

A is —CH₂—CH₂—,

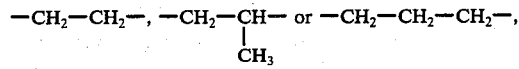

or —CH₂—CH₂—CH₂—, and n is from 2 to 4.

The amount of the basic copper phyhalocyanines, in the presence of which the finishing is carried out is from 0.5 to 7, preferably from 1 to 5, % by weight, based on the finely divided crude copper phthalocyanine (ie. the ground material).

The basic copper phthalocyanines to be used as growth regulators are known or may be manufactured by conventional methods, eg. by reacting copper phthalocyanine-sulfonic acid chlorides, which contain from 1 to 6 sulfonic acid chloride groups, with diamines of the formula

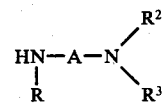

or by reacting mono- to hexa-chloromethyl-copper phthalocyanine with amines of the formula

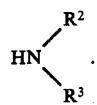

Yet a further method is to alkylate copper phthalocyanines which carry aminomethyl groups.

Examples of basic copper phthalocyanines of the formula II which can be used for the process according to the invention are reaction products of chloromethyl-copper phthalocyanines which carry from one to 6, preferably from 2 to 4, chloromethyl groups, or mixtures thereof, with dimethylamine, diethylamine, dipropylamine, dibutylamine, methylamine, ethylamine, propylamine, butylamine, amylamine, hexylamine, octylamine, 2-ethylhexylamine, decylamine, dodecylamine, stearylamine, palmitylamine, 3-(2'-ethylhexoxy)-propylamine, 3-methoxypropylamine, 3-ethoxypropylamine, 3-propoxypropylamine, 3-butoxypropylamine, 2-methyoxyethylamine, 2-ethoxyethylamine, 2-butoxyethylamine, cyclohexylamine, N,Nbiscyclohexylamine, N-methycyclohexylamine, piperidine, morpholine, N'-methylpiperazine, thiomorpholine, hexamethyleneimine (HN(CH₂)₆)

or mixtures thereof.

Suitable basic copper phthalocyanines of the formula I are, above all, reaction products of mono-, di- , tri or tetrasulfonic acid chlorides of copper phthalocyanine, or of mixtures of copper phthalocyanine-sulfonic acid chlorides, containing an average of from 2 to 4 sulfonic acid chloride groups, with diamines of the formula

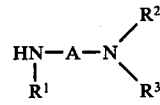

Specific examples of suitable amines for this reaction are 2-dimethylamino-ethylamine, 2-diethylamino-ethylamine, 2-dipropylamino-ethylamine, 2-dibutylamino-ethylamine, 3-dimethylamino-propylamine, 3-diethylamino-propylamine, 3-dibutylamino-propylamine, 2-cyclohexylamino-ethylamine, 3-cyclohexylamino-propylamine, 3-(methylcyclohexylamino)-propylamine, 2-stearylamino-ethylamine, 3-stearylamino-propylamine, N'-methylpiperazine and 4-diethylamino-1-methyl-1-butylamine.

The finishing process according to the invention is generally carried out by introducing the ground material into sulfuric acid, whilst the basic copper phthalocyanine is preferably introduced into the sulfuric acid beforehand, but can also be introduced together with the ground material. Alternatively, the mixture of ground material and basic copper phthalocyanine is prepared by grinding the basic copper phthalocyanine together with the crude copper phthalocyanine or adding the former toward the end of the grinding process. The essential feature is that the basic copper phthalocyanine used as the growth regulator should be present in the sulfuric acid during the finishing process. The finishing process in sulfuric acid will hereinafter also be referred to merely as the "treatment".

The treatment medium is sulfuric acid from 50 to 75% strength by weight, and a part of the water in this sulfuric acid may be replaced by glycols (e.g. ethylene glycol) or water-soluble glycol ethers (e.g. ethylene glycol ethers) or mixtures thereof. The amount of sulfuric acid is not critical and can vary within wide limits. The lower limit is set by the fact that is must be possible to stir the mixtures before, during and after the finishing process. In general, the amount of sulfuric acid used is from 3 to 15 times, preferably from 4 to 10 times, the amount by weight of the ground material. To ensure that the mixture remains homogeneous, it is (constantly) mixed by stirring or by means of other mixing devices.

The treatment in sulfuric acid is carried out at from room temperature to 100° C and preferably at from 30° to 100° C. It is usually continued until the pigment exhibits optimum tinctorial strength, which is generally the case after from 1 to 10 hours, usually after from 2 to 8 hours. Copper phthalocyanines in the α-, β- or γ- modification can be obtained as the product by suitable choice of the sulfuric acid concentration and of the temperature at which the ground material is finished.

Thus, copper phthalocyanine pigments in the α-modification are obtained from 75 to 62% strength by weight sulfuric acid at from room temperature to 50° C. In from 50 to 58, preferably from 50 to 54, % strength by weight sulfuric acid at from 70° to 110° C, preferably from 80° to 100° C, on the other hand, the pure β-modification is produced. Pigments in the γ-modification are obtained by finishing the gound material from 55 to 61, preferably from 58 to 60,% strength by weight sulfuric acid at from 30° to 60° C.

After completion of the finishing treatment, the reaction mixture containing sulfuric acid may be diluted with water or poured into water and the pigment isolated by filtering, centrifuging or decanting. The filter residue is washed neutral with water and may then be dried or be processed further directly as the moist press cake.

The products of the process according to the invention show a significantly greater tinctorial strength than copper phthalocyanine pigments which have been finished under otherwise identical conditions but in the abscence of basic copper phthalocyanines.

The Examples which follow illustrate the process. In the text which follows, parts and percentages are by weight.

EXAMPLE 1

100 parts of a crude copper phthalocyanine which has been manufactured from phthalonitrile and copper-I chloride by the solvent process has been gound for 30 hours in a ball mill without any grinding aid are stirred into a mixture of 60 parts of ethylene glycol and 800 parts of 65% strength sulfuric acid, to which 1 part of tetra-(diethylaminomethylene)-copper phthalocyanine has been added beforehand. The pigment suspension is stirred for 6 hours at 40° C. It is then diluted with water and the pigment is isolated in the conventional manner. 100 parts of an easily dispersible copper phthalocyanine is the α-modification are obtained, having a specific sulfur area of 62.2 m²/g, determined by nitrogen adsorption by the BET method (ie. the method of St Brunauer, P. H. Emmet and E. Teller, J. Amer. Chem. Soc. 60, 309 (1938)). The tinctorial strength of the pigment is about 10% greater than that of the pigment obtained from the same ground material and under otherwise identical conditions, but in the absence of tetra-(diethylaminomethylene)-copper phthalocyanine, ie. the comparative pigment. The latter has a surface area of 54 m²/g determined by the BET method.

EXAMPLE 2

The procedure followed as described in Example 1 except that instead of tetra-(diethylaminomethylene)-copper phthalocyanine, 2 parts of the reaction product of copper phthalocyanine-trisulfonic acid chloride and 3-cyclohexylaminopropylamine are used. After working up, a copper phthalocyanine pigment in the α-modification, having practically the the same tinctorial properties as the pigment obtained according to Example 1, is obtained. The specific surface area (measured by the BET method) is 66.4 m²/g. The tinctorial strength of the pigment is from 13 to 14% greater than that of a comparative pigment obtained, without addition of basic copper phthalocyanine, in accordance with Example 1.

EXAMPLE 3 a. 100 parts of a crude copper phthalocyanine which has been prepared from phthalic anhydride, urea and copper-I chloride by the solvent process and has been gound for 30 hours in a ball mill without any grinding aid are introduced into 500 parts of 54% strength sulfuric acid which contains 3 parts of a mixture of tetra- and tri-(diethylaminomethylene)-copper phthalocyanine, and the batch is stirred for 5 hours at from 98 to 100° C. After dilution with water, and working up, 100 parts of a copper phthalocyanine pigment in the β-modification, having a specific surface area, measured by the BET method, of 69.2 m²/g, are obtained. The tinctorial strength of the pigment is 13% greater than that of the comparative pigment obtained according to (b).

b. Comparative experiement:

The procedure followed is as described under a) except that no basic copper phthalocyanine compound is added to the sulfuric acid. The β-copper phthalocyanine pigment obtained has a specific surface area, measured by the BET method, of 49.5 m²/g.

EXAMPLE 4

The procedure followed is as described in Example 3(a) except that instead of the diethylaminomethylene compound 1 part of the reaction product of copper phthalocyanine-trisulfonic acid chloride and -tetrasulfonic acid chloride with 3-cyclohexylamino-propylamine is used. A pigment is the β-modification, having a specific surface area, measured by the BET method, of 64.2 m²/g, is obtained. The tinctorial strength of the pigment is 12% greater than that of the comparative pigment obtained according to 3(b).

EXAMPLE 5 a. 100 parts of the gound material described in Example 3(a) are introduced into a mixture of 360 parts of 65% strength sulfuric acid and 110 parts of ethylene glycol, which contains 3 parts of tetra-(diethylaminomethylene)-copper phthalocyanine, and the batch is stirred for 4 hours at from 88° to 90° C. After working up 100 parts of a copper phthalocyanine pigment in the β-modification, having a specific surface area, measured by the BET method, of 70.4 m²/g, are obtained. The tinctorial strength of the pigment is 11% greater than that of the comparative pigment obtained according to (b).

b. Comparative experment:

The procedure followed is as described under (a) but without diethylaminomethylene-copper phthalocyanine. A pigment in the β-modification, having a specific surface area, measured by the BET method, of 55.4 m²/g, is obtained

EXAMPLES 6 TO 10

The same result in Example 3a, 4 or 5a is obtained if the finishing in the sulfuric acid mixture is carried out in the presence of X parts of the following basic copper phthalocyanines;

EXAMPLE 11 a. 100 parts of a chlorine-free crude copper phthalocyanine which was prepared from phthalonitrile and copper-I chloride by the solvent process and was ground for 30 hours in a ball mill without any grinding aid are introduced into 800 parts of 59.5% strength sulfuric acid which contains 3 parts of a mixture of tetra- and tri-(diethylaminomethylene)-copper phthalocyanine, and the batch is stirred for 4 hours at 40° C. Hereupon the monosulfate of the unsubstituted copper phthalocyanine precipitates. The mixture is then decomposed with water and the pigment is isolates. Yield: 100 parts of a copper phthalocyanine pigment in the γ-modification, having a specific surface area, measured by the BET method, of 60.1 m²/g. the tinctorial strength is 20% greater than that of the comparative pigment obtained according to (b).

b. Comparative experiment: The procedure followed is as described under a), but is carried out in the absence of diethylaminomethylene-copper phthalocyanine. A γ-copper phthalocyanine which has a specific surface area, measured by the BET method, of 42.4 m²/g, is obtained.

EXAMPLE 12

The procedure followed is as described in Example 11(a), except that 3 parts of

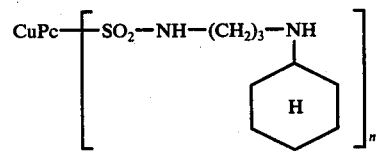

where $n$ is 2, 3 and 4, are used as the basic copper phthalocyanine.

| Ex. | basic copper phthalocyanine | | X (parts) |
|---|---|---|---|
| 6 | $CuPc\left[-SO_2NH-(CH_2)_3-NH-\underset{H}{\underset{|}{C_6H_{10}}}-CH_3\right]_n$ | Mixture of n = 3 and 4 | 3 |
| 7 | $CuPc\left[-SO_2-NH-(CH_2)_3-N(CH_3)_2\right]_n$ | n = 3 and 4 | 2 |
| 8 | $CuPc\left[-SO_2-NH-\underset{CH_3}{\underset{|}{CH}}-(CH_2)_3-N(C_2H_5)_2\right]_n$ | n = 3 and 4 | 3 |
| 9 | $CuPc\left[-SO_2-N\underset{\smile}{\frown}N-CH_3\right]_n$ | n = 3 and 4 | 2 |
| 10 | $CuPc\left[-SO_2-NH-(CH_2)_3-\underset{H}{\overset{H}{N}}-C_{18}H_{37}\right]_n$ | n = 3 and 4 | 5 |

The resulting copper phthalocyanine pigment in the γ-modification has a specific surface area, measured by the BET method, of 66.6 m²/g and its tinctorial strength is from 22 to 25% greater than that of the comparative pigment obtained according to Example 11(b).

EXAMPLE 13 a. 100 parts of a crude copper phthalocyanine which has prepared from phthalic anhydride, urea and copper-I chloride by the solvent process and ground for 30 hours in a ball mill without any grinding aid are introduced into 800 parts of 60% strength sulfuric acid which contains 2 parts of a mixture of CuPc [CH$_2$-N(C$_2$H$_5$)$_2$]$_n$, where $n$ is 3 and 4, and the batch is stirred for 5 hours at 40° C. After working up, 100 parts of a pigment in the γ-modification, having a specific surface area, measured by the BET method, of 55.9 m²/g, are obtained. The tinctorial strength of the pigment is about 20% greater than that of the comparative pigment obtained according to the 13(b).

b. Comparative experiment:

The procedure followed in as described under a) but is carried out in the absence of the basic copper phthalocyanine compound. The pigment isolated is in the form of long needles. Specific surface area measured by the BET method: 45.9 m²/g.

I claim:

1. In a process for converting crude copper phthalocynines into a pigmentary form by sulfuric acid treatment of finely particled copper phthalocyanines, which have crystallized irregularly and are heavily agglomerated, and which have a primary particle size of less than 0.1 μ and are obtained by grinding crude copper phthalocyanines in a ball mill in th absence of grinding aids, the improvement wherein the ground material is introduced into sulfuric acid of from 50 to 75% strength by weight in the presence of from 0.5 to 7% by weight, based on the crude copper phthalocyanine, of one or more basic copper phthalocyanines of the formula

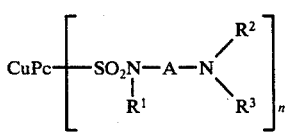
(I)

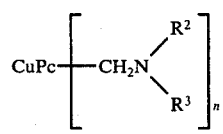
(II)

or mixtures thereof, where CuPc is an n-valent copper phthalocyanine radical, R¹ is hydrogen alkyl of 1 to 4 carbon atoms, A is saturated, linear or branched alkylene of 2 to 6 carbon atoms, R² is alkyl of 1 to 20 carbon atoms, alkoxyalkyl of a total of 3 to 12 carbon atoms or cycloakyl of 6 to 8 carbon atoms, R³ is hydrogen, alkyl of 1 to 4 carbon atoms or cycloalkyl of 6 to 8 carbon atoms or the group

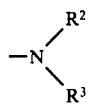

is a saturated heterocyclic 5-membered, 6-membered or 7-membered ring or a saturated 6-membered heterocyclic ring which may additionally contain an oxygen, sulfur or nitrogen atom as a ring member,

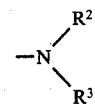

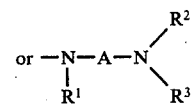

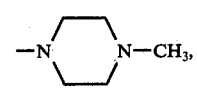

and $n$ is from 1 to 6, and the mixture is kept at from room temperature to 100° C until the pigment has acquired optimum tinctorial strength, and the pigment is then separated from the sulfuric acid and isolated.

2. A process as claimed in claim 1, wherein from 1 to 5% by weight, based on copper phthalocyanine, of basic copper phthalocyanine is used.

3. A process is claimed in claim 1, wherein basic copper phthalocyanines are used, in which R¹ is hydrogen, R² is alkyl of 1 to 8 carbon atoms or cycloalkyl of 6 to 8 carbon atoms and R³ is hydrogen or alkyl of 1 to 4 carbon atoms or the group

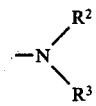

is a N-piperidine, N-morpholine, N-(N'-methypiperazine), N-thiomorpholine or N-hexamethyleneimine group, A is

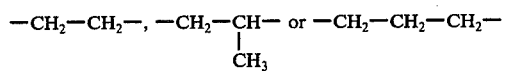

or —CH$_2$—CH$_2$—CH$_2$— and $n$ is a number from 2 to 4.

4. A process as claimed in claim 1, wherein basic copper phthalocyanines are used, in which R¹ is hydrogen, R² is methyl, ethyl, propyl, butyl, cyclohexyl or methylcyclohexyl and R³ is hydrogen, methyl, ethyl, propyl, butyl or cyclohexyl or the group

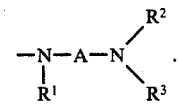

is N'-methyl-piperazinyl, A is

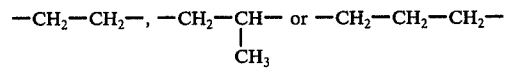

or —CH$_2$—CH$_2$—CH$_2$— and $n$ is 2, 3 or 4.

5. A process as claimed in claim 1, wherein basic copper phthalocyanines from the group consisting of

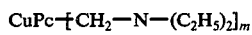

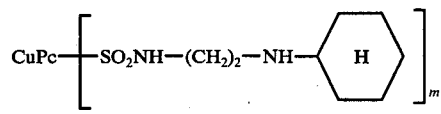

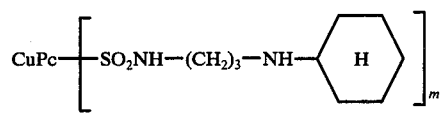

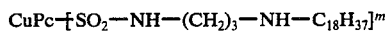

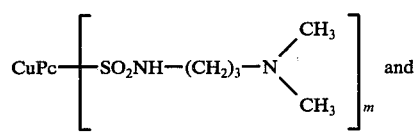

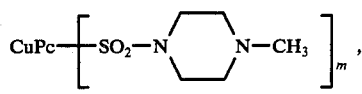

where $m$ is one of the number 2, 3 and 4, are used.

6. A process as claimed in claim 1, wherein mixtures of sulfuric acid with ethylene glycol, with water-soluble ethylene glycol ethers are with mixtures of these solvents are used as the treatment medium.

7. A process as claimed in claim 1, wherein the treatment of the ground material is carried out in from 50 to 54% strength by weight sulfuric acid at from 70° to 110° C.

8. A process as claimed in claim 1, wherein the treatment of the ground material is carried out in from 58 to 60% strength by weight sulfuric acid at from 30° to 60° C.

9. A process as claimed in claim 1, wherein the treatment of the ground material is carried out in from 75 to 62% strength by weight sulfuric acid at from room temperature to 50° C.

10. The product obtained by the process of claim 1.

* * * * *

UNITED STATES PATENT AND TRADEMARK OFFICE
CERTIFICATE OF CORRECTION

PATENT NO. : 4,039,346
DATED : August 2, 1977
INVENTOR(S) : Joachim Kranz

It is certified that error appears in the above-identified patent and that said Letters Patent are hereby corrected as shown below:

Column 10, line 15, after the formula insert --is--;

Column 10, line 50, delete "or $-CH_2-CH_2-CH_2-$";

Column 10, last line, delete "or $-CH_2-CH_2-CH_2-$".

Column 12, line 10, change "are" to --or--.

Signed and Sealed this

Fifteenth Day of August 1978

[SEAL]

Attest:

RUTH C. MASON
Attesting Officer

DONALD W. BANNER
Commissioner of Patents and Trademarks